United States Patent
Polk, Jr. et al.

(10) Patent No.: US 9,613,482 B1
(45) Date of Patent: *Apr. 4, 2017

(54) SYSTEM AND METHOD FOR AUTHORIZING TRANSACTIONS USING A METALLIC COIN HAVING UNIVERSALLY MACHINE READABLE STORED VALUE INDICIA

(71) Applicant: Comdata, Inc., Brentwood, TN (US)

(72) Inventors: James W. Polk, Jr., Georgetown, IN (US); Dustin Szwed, Louisville, KY (US); Dan Mehling, Louisville, KY (US)

(73) Assignee: COMDATA INC., Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,720

(22) Filed: Dec. 1, 2016

Related U.S. Application Data

(63) Continuation of application No. 14/822,971, filed on Aug. 11, 2015, now Pat. No. 9,514,594.

(51) Int. Cl.

| | |
|---|---|
| *G06Q 40/00* | (2012.01) |
| *G07D 11/00* | (2006.01) |
| *G07F 19/00* | (2006.01) |
| *G07F 1/06* | (2006.01) |
| *G06Q 20/20* | (2012.01) |
| *G06K 7/10* | (2006.01) |

(Continued)

(52) U.S. Cl.
CPC .............. *G07F 1/06* (2013.01); *B21D 22/02* (2013.01); *G06K 7/10009* (2013.01); *G06K 7/10712* (2013.01); *G06K 19/06046* (2013.01); *G06Q 20/20* (2013.01)

(58) Field of Classification Search
CPC .......... G06Q 40/00; G07F 19/00; G06K 5/00; G06K 7/08; G06K 19/00; G06K 19/02; G06F 17/00
USPC ................ 235/379, 380, 449, 488, 487, 375
See application file for complete search history.

(56) References Cited

U.S. PATENT DOCUMENTS

| | | | |
|---|---|---|---|
| 4,475,975 A | 10/1984 | Talley et al. | |
| 5,216,234 A * | 6/1993 | Bell | .......................... G06K 7/14 |
| | | | 194/214 |
| 6,871,788 B2 | 3/2005 | Tompkin et al. | |

(Continued)

*Primary Examiner* — Edwyn Labaze
(74) *Attorney, Agent, or Firm* — Patterson Intellectual Property Law, PC; Edward D. Lanquist, Jr.; Gary L. Montle

(57) ABSTRACT

A system is provided for a metallic coin that may be scanned and implemented for stored value account transactions using traditional point-of-sale devices. The coin has two sides, a first surface portion of the second side having a less reflective matte finish relative to the first side and a second surface portion of the second side. A substantially transparent coat layer is upon the first surface portion of the second side, with an ink layer comprising machine readable indicia further thereupon. The machine readable indicia include a unique identifier with respect to the metallic coin. A hosted server is functionally linked to the traditional point-of-sale device via a communications network and configured upon receiving the identifier as scanned from the point-of-sale device to extract stored value information corresponding to an account associated with the identifier, and transmit said information to the point-of-sale device.

20 Claims, 5 Drawing Sheets

(51) Int. Cl.
*G06K 19/06* (2006.01)
*B21D 22/02* (2006.01)

(56) References Cited

U.S. PATENT DOCUMENTS

| | | | |
|---|---|---|---|
| 7,700,158 B2 | 4/2010 | Truong | |
| 7,918,455 B2 * | 4/2011 | Chapet | A44C 21/00 |
| | | | 273/138.2 |
| 8,337,010 B2 | 12/2012 | Geller | |
| 2006/0124578 A1 * | 6/2006 | Yousif | B65D 51/20 |
| | | | 215/347 |
| 2006/0160628 A1 * | 7/2006 | Abe | G06K 19/047 |
| | | | 463/47 |
| 2008/0245865 A1 * | 10/2008 | Mosteller | B42D 25/00 |
| | | | 235/449 |
| 2010/0044431 A1 | 2/2010 | Komatsu et al. | |
| 2010/0294015 A1 * | 11/2010 | Fahrenbach | B44B 5/009 |
| | | | 72/372 |
| 2011/0048979 A1 * | 3/2011 | Ehrlich | B65D 73/0028 |
| | | | 206/216 |
| 2011/0161252 A1 * | 6/2011 | Carr | B32B 37/182 |
| | | | 705/500 |

* cited by examiner

SYSTEM AND METHOD FOR AUTHORIZING TRANSACTIONS USING A METALLIC COIN HAVING UNIVERSALLY MACHINE READABLE STORED VALUE INDICIA

CROSS-REFERENCES TO RELATED APPLICATIONS

This application is a continuation of co-pending U.S. patent application Ser. No. 14/822,971, filed Aug. 11, 2015.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to stored value tokens. More particularly, the present invention relates to a metallic coin configured as a stored value token, and a system and method for implementing said coin and traditional point of sale devices to authorize stored value transactions.

Stored value tokens are often manufactured and distributed in the form of paper certificates or credit card sized plastic gift cards. The ubiquity of the plastic card format makes traditional gift cards difficult to distinguish from one another or from credit cards. As currency becomes increasingly digital, coins are becoming a novelty. Currency-based coins are becoming less desirable because of their comparatively low ascribed value and/or fixed value; whereas a stored value token like a credit card can be associated with any financial amount, a currency coin is limited only to its face value. The number of coins one would have to carry to match the stored value of a credit card or gift card is impractically high. Thus, fewer people carry coins than cards, making the coin a relative rarity in today's economic market.

This increasing rarity is contrary to a coin's usefulness as a unique form factor. The weight and spatial presence of a metal coin is easier to detect and distinguish from other wallet-stored or pocketed items. Unlike cards, which must be visually confirmed in order to distinguish them from other coins, a coin can be felt by touch, its texture, size, and weight discerned, and its practicality identified therefrom without necessitating visual distinction. Thus, a stored value token configured in the form factor of a metallic coin may be more readily distinguishable from card-based form factors.

To implement a metallic stored value token such as a coin, it is necessary to solve the problem of dynamic tokenization: the ascription of a dynamic value to a static object. Gift cards and similar form factors use unique identifiers such as barcodes or magnetic stripes to store account information that a card reader can associate with a user account and determine a balance associated with the card. The application of a magnetic stripe to a coin is impractical because of both magnetic interference and an inability to use the coin effectively in magnetic strip readers. Similarly, certain applications of a barcode have been a practical difficulty because of the reflective nature of the metal body. Whereas printing ink on metal is currently known to one skilled in the art of printing, the printing of ink on metal does not solve the reflective problems associated with scanning a barcode printed on metal. Linear barcode scanners have much greater difficulty reading the barcode via reflected illumination because of interference from reflected and refracted light bouncing off of the metallic structure. Image scanners similarly have trouble with metal surfaces when the reflection of ambient lights and colors interfere with the barcode pattern.

Thus, what is needed is a method for producing a metallic stored value token with a machine-readable identifier where the identifier is made more easily readable by a scanner device. A novel method for producing such a value token involves roughening a portion of the metallic structure of the value token to a matte, non-reflective finish, applying an adhesion-improving primer to at least the roughened portion, and inking an identifier onto the roughened portion on top of the primer. By producing a metallic value token where only a portion of the structure associated with the identifier has a comparatively matte finish, the identifier becomes more easily discernible by traditional scanning devices such as barcode scanners and image scanners without compromising the distinctive and identifiable reflective metal finish of the entire value token. The addition of a primer layer in between the matte metal portion and the ink improves the adhesion of the ink to the metal and prevents the ink from being easily scraped off either intentionally or due to wear.

BRIEF SUMMARY OF THE INVENTION

Provided herein are systems and methods for producing and implementing a three-dimensional, metallic, stored value token with a machine-readable identifier, for the purpose of authorizing stored value transactions in a traditional point of sale environment.

In an embodiment as disclosed herein, a system includes a metallic coin having a first side and a second side. A first surface portion of the second side is provided with a less reflective matte finish relative to the first side and a second surface portion of the second side. A substantially transparent coat layer is upon the first surface portion of the second side, and further upon the substantially transparent coat layer is an ink layer of machine readable indicia, comprising a unique identifier with respect to the metallic coin. A hosted server is functionally linked to the traditional point of sale device via a communications network, and configured upon receiving the identifier as scanned from the point of sale device to extract stored value information corresponding to an account associated with the identifier, and transmit said information to the point of sale device.

In one exemplary aspect, the metallic coin may further include an embedded RFID tag or wireless bidirectional transceiver, interoperable with respect to point of sale RFID readers or the like.

In another exemplary aspect, the machine readable indicia may comprise a barcode readable by traditional point of sale barcode scanners. The machine readable indicia may further be radially configured.

In another exemplary aspect, the substantially transparent coat layer of the metallic coin comprises a substantially transparent lacquer, which may further be layered upon the first and second sides of the metallic substrate. The machine readable indicia may comprise the ink layer bonded with the lacquer.

In another exemplary aspect, a graphical user interface may be linked to the hosted server and configured to enable user selection of an identifier from among one or more of the identifiers available to the user, wherein the identifier is assigned to a stored value account associated with the user. Alternatively, the graphical user interface may enable selection of a user account from among a plurality of user accounts, wherein the identifier is assigned to the selected account.

In an embodiment, a graphical user interface may be configured to receive user selection input corresponding to an identifier unique to a stored value account and further a logo unique to a class of stored value accounts. The ink layer of the metallic coin is applied to include machine readable indicia comprising the selected unique identifier upon the substantially transparent coat layer on the first surface portion, and non-machine readable indicia comprising the selected logo.

In one exemplary embodiment, the metallic coin may be manufactured according to a method generally including the steps of stamping each of a plurality of metallic substrates into a coin form having a first side and a second side; mechanically roughening a first portion of a die; striking the second side for each of the stamped substrates with the die, wherein the first portion of the die corresponds in position to a first surface portion of the second side of the stamped substrates and produces a less reflective matte finish for the first surface portion; applying a substantially transparent coat layer to at least the first surface portion of the second side of each stamped substrate; and applying an ink layer to the first surface portion of the second side of each substrate, thereby generating machine readable indicia unique to each respective one of the plurality of stamped substrates.

In such embodiments, the first portion of the die may be mechanically roughened by abrasive blasting, such as, for example, sandblasting.

In such embodiments, the ink layer may be applied using various application methodologies. For example, the ink layer may be applied using an inkjet printer, or with substantially increased printing speeds using certain preferred printing methods such as for example a drop-on-demand (DOD) application.

In some embodiments, the metallic coin substrates may be selected from a group of metallic elements having substantially reflective surfaces, including for example but without limitation one or more of the following: brass-plated steel; aluminum; bronze; silver; gold; and pewter.

DETAILED DESCRIPTION OF THE INVENTION

Figure 1:
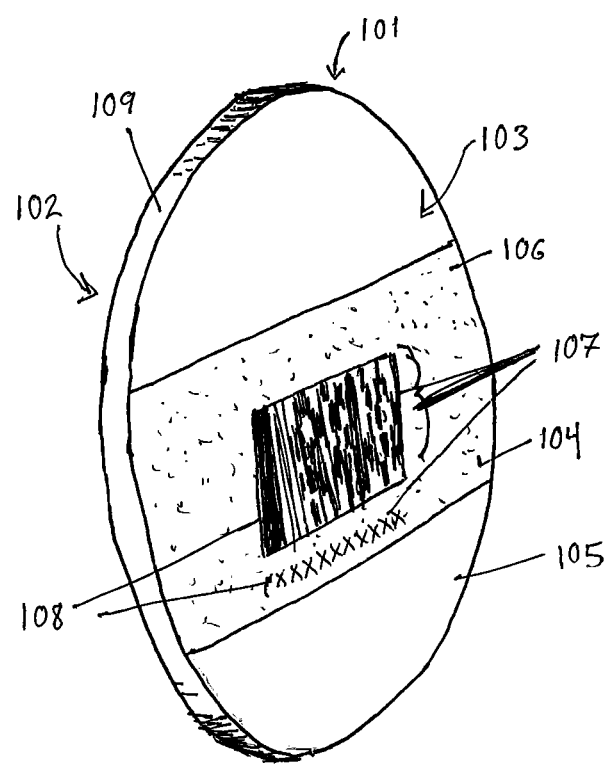
FIG. 1 is a three-dimensional perspective view representing an embodiment of a metallic stored value token in accordance with the present disclosure.

Referring generally to FIGS. 1-7, various exemplary embodiments of an invention may now be described in detail. Where the various figures may describe embodiments sharing various common elements and features with other embodiments, similar elements and features are given the same reference numerals and redundant description thereof may be omitted below.

FIG. 1 is a three-dimensional perspective view representing an embodiment of a metallic stored value token 101. The stored value token 101 is comprised of a metallic substrate 109 which has been stamped into a substantially planar three-dimensional form. The planar form has a first side 102, which in the perspective view of FIG. 1 is facing substantially away from the view, and a second side 103, which in the perspective view of FIG. 1 is facing substantially towards the viewer. In certain embodiments, the first side 102 may be stamped into a three-dimensional shape comparative to its substantially planar surface. In said certain embodiments, the stamping process may be embossing or debossing so as to leave an image in relief.

Typically in a process concurrent with stamping of the first side of the token, the second side 103 is stamped with a portion of the die that has been mechanically roughened, the die stamp creating on the second side 103 at least a first surface portion 104 in the area where one or more mechanically roughened portions of the die have contacted the stored value token 101 and by contrast at least a second surface portion 105 where the one or more mechanically roughened portions of the die have not contacted the stored value token 101. The first surface portion(s) 104 may be comparatively less reflective than the second surface portion(s) 105 or a surface of the first side 102, the first surface portion 104 provided with a substantially matte finish via application of the roughened die stamp. In various embodiments, each token is struck on each of the first and second sides at the same time and in their entirety with a two-sided die. In a particular embodiment, each token is in fact struck more than once to obtain a more definite image.

The second side 103 of the stored value token 101 receives a substantially transparent coat layer 106 and then an ink layer 107. The ink layer 107 may be applied superficially to the substantially transparent coat layer 106 over at least a sub-portion of the first surface portion 104 of the second side 103. The ink layer 107 may comprise machine-readable indicia 108 which are unique to a particular token 101 or in certain embodiments at least a first set of machine-readable indicia which are unique to a particular token and at least a second set of indicia which are unique to a class of tokens. In one embodiment, the substantially transparent coat layer 106 may be applied only to the first surface portion 104 of the second side 103. In another embodiment, the substantially transparent coat layer 106 may be applied to each of the surface portions (e.g., both of the first surface portion 104 and the second surface portion 105) of the second side 103. In still another embodiment, the substantially transparent coat layer 106 may be applied as a full flood application to the entirety of both the first side 102 and second side 103. This last embodiment may typically be preferred as the coat layer can be provided to protect the token against tarnishing.

In some embodiments, the substantially transparent coat layer 106 may comprise a substantially transparent lacquer. The lacquer may be, for example, urushiol-based, nitrocellulose-based, acrylic-based, water-based, and the like, various desirable complements, supplements or alternatives for which may be apparent to those of skill in the art. In certain embodiments, the lacquer may be selected and applied so as to be capable of receiving the ink layer 107 and bonding with the received ink layer 107 to prevent or at least make relatively difficult the removal of the ink layer 107 or at least the machine readable indicia 108 thereof through chemical and non-chemical means such as, for example, friction or washing.

The machine-readable indicia 108 may comprise one or more printed identifiers such as, for example, a bar code, image, or alphanumeric code. The printed identifiers may in some embodiments be incremental such that each stored value token 101 is associated with at least one unique identifier, set of identifiers, or machine-readable indicia 108. In certain embodiments, the printed identifiers may be covered by a removable layer. The removable layer may be an adhesively bonded superficial layer placed over the printed identifiers so as to cover them from view until the superficial layer removed. Alternatively, the superficial layer may be a non-adhesive layer such as, for example, latex ink, acrylic paint, wax-coat, UV ink, and the like, wherein the non-adhesive layer does not readily bond with the substantially transparent coat layer 106 and by which a user removes the non-adhesive layer through scratching through or applying friction to the ink layer so as to remove that layer and expose the underlying ink layer 107.

The stored value token 101 may in certain embodiments comprise a non-planar element 109 that joins the first side 102 to the second side 103. The non-planar element 109 may in some embodiments be textured via stamping to provide grip or distinctive feel to assist in non-visual identification of the stored value token 101. In some embodiments, the ink layer 107 may be further applied to the non-planar element 109 to assist in visual identification of the stored value token 101.

Figure 2A:
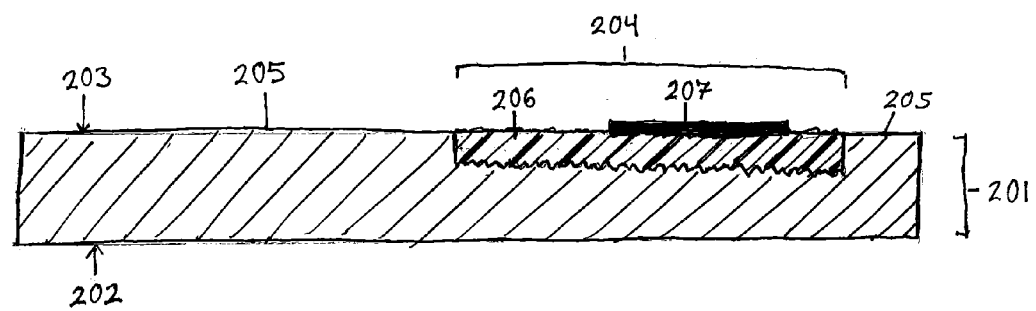
FIG. 2A is a two-dimensional schematic side view representing an embodiment of a second metallic stored value token in accordance with the present disclosure.
Figure 2B:
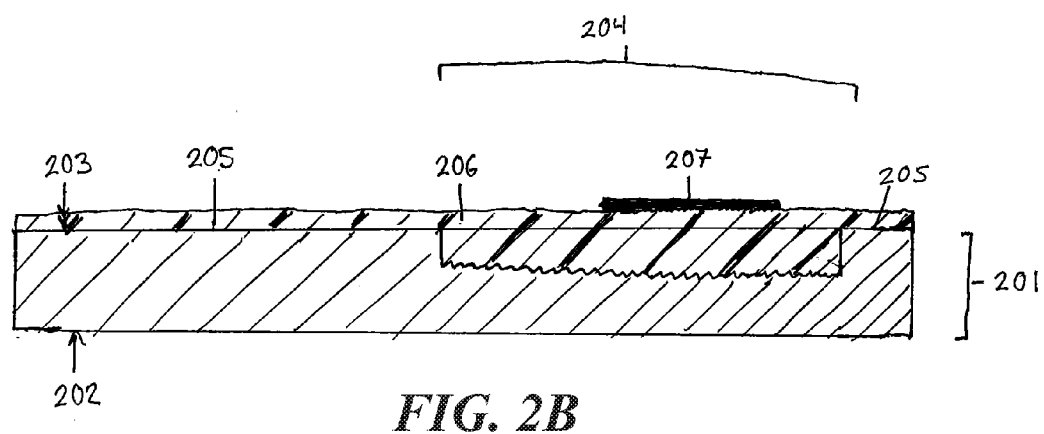
FIG. 2B is a two-dimensional schematic side view representing a second embodiment of a second metallic stored value token in accordance with the present disclosure.

FIGS. 2A and 2B are two-dimensional schematic side views each representing an embodiment of a metallic stored value token in accordance with the present disclosure. FIGS. 2A and 2B may each be interpreted with respect to one or more embodiments of a stored value token as previously described with respect to FIG. 1. Elements 201 through 207 and variations thereof may for example be generally interpreted to correspond to elements 101 through 107 and variations thereof, respectively. The stored value token 201 comprises a metallic substrate stamped into a substantially planar form with a first side 202 and a second side 203. The second side 203 is stamped with a mechanically roughened portion of the die to produce a matte, roughened texture within a first surface portion 204, and by contrast, leaving a second surface portion 205 unmodified from the standard metallic sheen of the metallic substrate. A substantially transparent coat layer 206 is applied to at least the first surface portion 204. In FIG. 2A, the substantially transparent coat layer 206 is applied only to the first surface portion 204. Comparatively, in FIG. 2B, the substantially transparent coat layer 206 is applied to both the first surface portion 204 and second surface portion 205. In embodiments not depicted, the substantially transparent coat layer 206 may be further applied to the opposing planar first side 202.

An ink layer 207 is deposited on top of the substantially transparent coat layer 206 wherein corresponding machine-readable indicia are deposited in superficial relation to the first surface portion 204. The first surface portion 204 may be comparatively less reflective than the second surface portion 205 such that machine optical sensors may more easily read the indicia deposited thereupon. In some embodiments, the ink layer 207 may comprise indicia that are non-machine-readable. For example, non-machine-readable indicia may include logos, instructions, legal information, contact information, and the like. In said embodiments, the non-machine-readable indicia may be deposited in superficial relation to the first surface portion 204, the second surface portion 205, or both surface portions 204 and 205.

Figure 5:
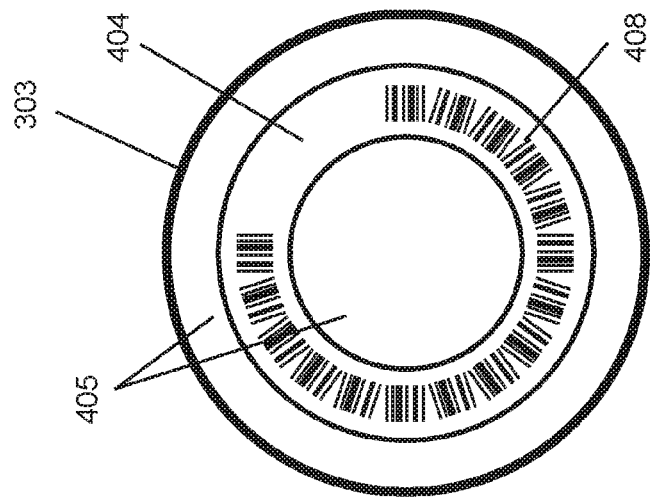
FIG. 5 is a two-dimensional perspective view representing a third embodiment of a second side of a metallic stored value token in accordance with the present disclosure.
Figure 4:
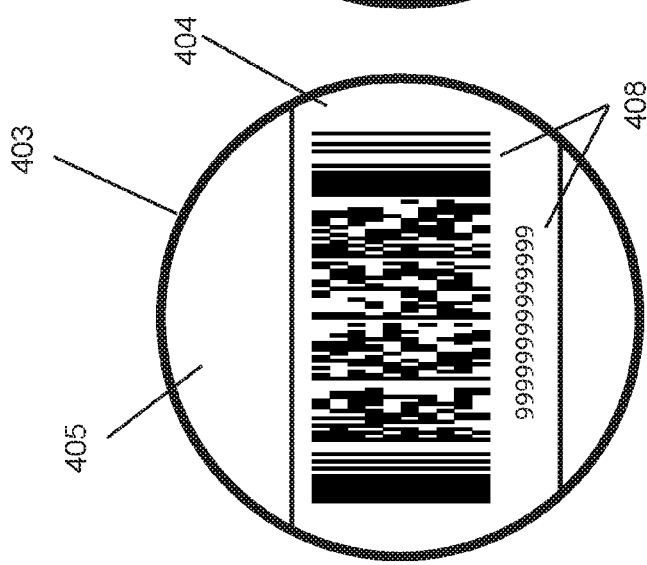
FIG. 4 is a two-dimensional perspective view representing a second embodiment of a second side of a metallic stored value token in accordance with the present disclosure.
Figure 3:
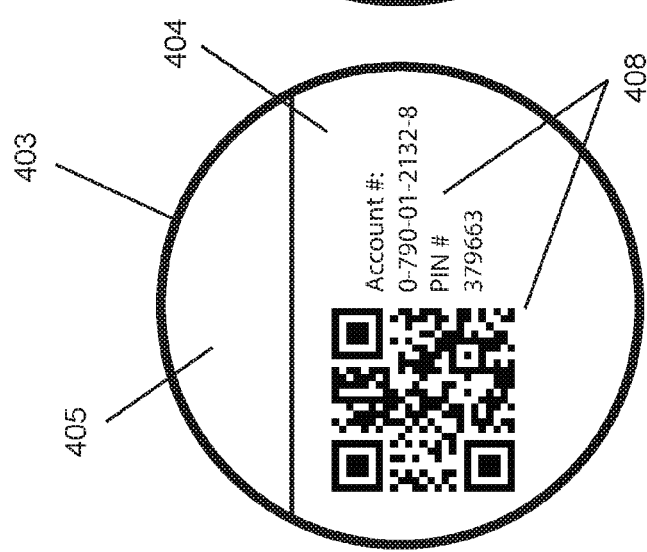
FIG. 3 is a two-dimensional perspective view representing a second side of a metallic stored value token in accordance with the present disclosure.

FIGS. 3-5 are two-dimensional perspective views each representing an embodiment of a second side of a metallic stored value token in accordance with the present disclosure. FIGS. 3-5 may each be interpreted with respect to one or more embodiments of a stored value token as previously described with respect to FIG. 1. Elements 403, 404, 405, and 408 and variations thereof may for example be generally interpreted to correspond to elements 103, 104, 105, and 108 and variations thereof, respectively. A second side 403 of the stored value token comprises at least a first surface portion 404 and at least a second surface portion 405. With respect to the first surface portion 404, one or more machine-readable indicia 408 may be oriented within the area of the first surface portion 404 such that the negative space of the machine-readable indicia 408 comprises the matte finish of the first surface portion 404.

In certain embodiments, a plurality of machine-readable indicia 408 may be used. For example, machine-readable indicia 408 may include one or more of the following: a linear barcode, a QR code, a 3-D barcode, a C-128 barcode, a UPC, a dot-matrix code, a numeric code, an alphanumeric code, an image, etc. At least a portion of the machine-readable indicia 408 may typically be inherently unique with respect to each stored value token such that each value token has a distinctive and unique identifier with respect to the machine-readable indicia 408 thereupon. For example, the machine-readable indicia 408 may be incremental such that each stored value token produced in sequence is uniquely identifiable amongst a series.

In an embodiment, a plurality of machine-readable indicia 408 upon a stored value token may be uniquely identifiable in relation to the stored value token but unique to one another, such that each machine-readable indicium 408 is an alternative expression of the same indicia (e.g. a linear barcode and a corresponding numeric code). In an alternative embodiment, the machine-readable indicia 408 may contain a plurality of unrelated and unique identifiers such that each indicium is associated with a separate stored value account.

In certain embodiments, the machine-readable indicia 408 may be arranged in a manner advantageous to the shape of the stored value token. For example, in the case of a coin-shaped token, machine-readable indicia 408 may be radially configured such that a machine reading device can more easily read the indicia as it rolls down a coin chute (e.g. FIG. 5).

Figure 6:
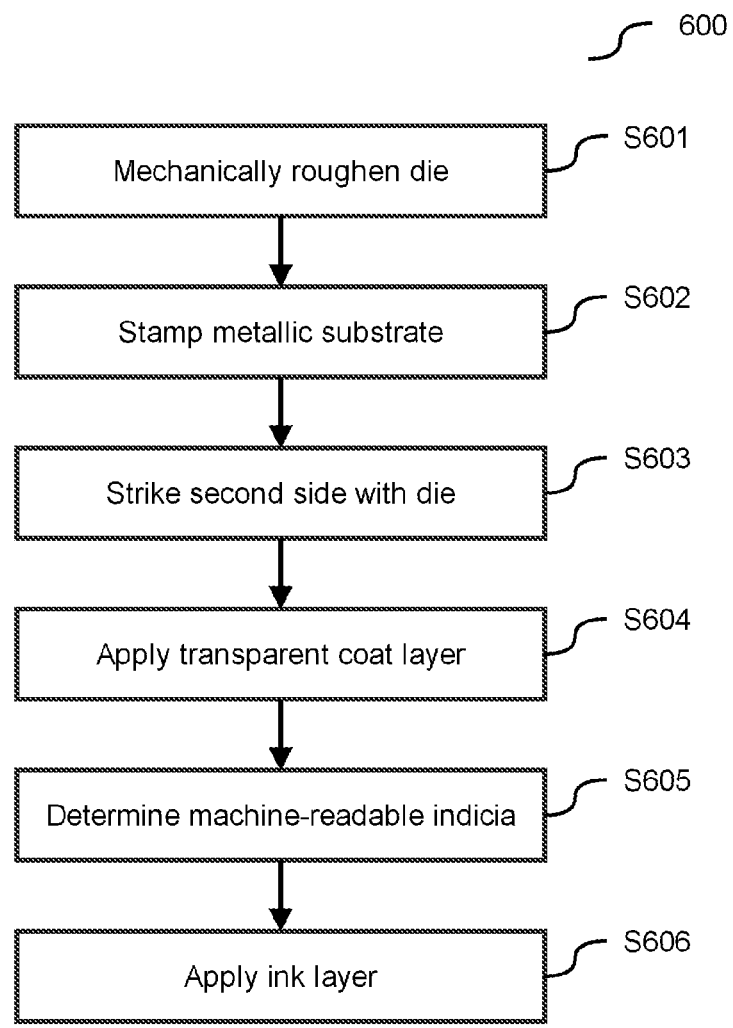
FIG. 6 is a flowchart representing an embodiment of a method for producing a metallic stored value token in accordance with the present disclosure.

FIG. 6 is a flowchart representing an embodiment of a method 600 for producing a metallic stored value token in accordance with the present disclosure. Depending on the embodiment and unless otherwise expressly stated, certain acts, events, or functions of such a method as described herein can be performed in a different sequence, can be added, merged, or left out altogether. Moreover, in certain embodiments and unless otherwise expressly stated, it is possible that two or more of the acts or events may be performed concurrently or with respect to at least partially overlapping periods of time rather than sequentially or otherwise in accordance with discrete and separate periods of time.

In the described embodiment, the method 600 begins at a first step S601 wherein a die stamp is mechanically roughened on at least one side or surface thereof so as to produce a matte finish on a metallic substrate to which the die is stamped. In some embodiments, the die may be mechanically roughened by means of abrasive blasting. For example, the die may be roughened by means of sandblasting, bead blasting, wet abrasive blasting, micro-abrasive blasting, wheel blasting, bristle blasting, and other like blasting methods for roughening a smooth surface. In other embodiments, non-blasting abrading methods may be used. For example, the die may be mechanically roughened via a mechanical sanding device using sandpaper or steel wool.

In step S602, a metallic substrate is stamped into a substantially planar three-dimensional form having at least two planarly oriented sides. In an embodiment, the metallic substrate may be stamped into a coin. In other embodiments, the metallic substrate may be stamped into other planar three-dimensional shapes such as, for example, a card. In certain embodiments, one or both of the planarly oriented sides may be embossed or debossed in the stamping process so as to produce a three-dimensional image on the stamped side. In some embodiments, the non-planar elements such as the dimensional structure conjoining the first and second planar side may be embossed or debossed or otherwise textured in the stamping process.

The stamped metallic substrate is struck upon at least the second side with the mechanically roughened portion of the die of S601, the roughened die-stamp causing the stamped surface portion of the second side to be matte in finish with respect to the surface portion of the metallic substrate not stamped by the roughened die.

In step S603, a substantially transparent coat layer is applied to at least the stamped surface portion of the second side. In an embodiment, the transparent coat layer serves as an adhesive bonding agent for a subsequent ink layer, allowing the ink to bond more readily with and resist removal from the stored value token. This adhesive boding aspect is particularly advantageous is certain aspects such as for example substantially increased printing speeds which are facilitated in accordance with the present disclosure, using certain printing methods such as DOD as further described below.

In step S604, the one or more machine-readable indicia to be uniquely associated with the stored value token are determined. In one embodiment, the determination of the machine-readable indicia may be made in accordance with the sequential generation of a plurality of stored value tokens. For example, the machine-readable indicia may have substantially sequential components or aspects. In another embodiment, the determination of the machine-readable indicia may be selectable by a user. For example, the machine-readable indicia may be determinable in accordance with the user selection of one or more identifiers in association with the user and with a stored value server system.

In a further embodiment, a user may be able to create a stored value token at a machine kiosk, whereupon the user may select one or more stored value server system identifiers on a graphical user interface in association with the user. For example, the user may select an identifier associated with a retail merchant account from a plurality of retail merchant accounts. In still further embodiments, one or more of the metallic substrate stamping and the ink layer may be uniquely determined in accordance with the user selection; the corresponding account logo to be stamped or inked in accordance with the indicia chosen to be printed on the stored value token.

In step S606, an ink layer is applied to the first surface portion of the second side, the ink layer comprising the determined machine readable indicia. In one embodiment, the ink layer may be directly printed on top of the substantially transparent coat layer of the first portion of the second side. In an alternative embodiment, the ink layer may be transferred on top of the substantially transparent coat layer of the first portion of the second side via dye sublimation. In some embodiments, the ink layer may be applied via an inkjet printer, using, for example, a continuous inkjet (CLJ) method. In further embodiments, the ink layer may be applied via DOD application, such as Inkjet DOD or piezoelectric DOD.

In some embodiments, the ink layer may be comprised of non-human-readable inks such as UV-fluorescent ink or other similar security inks. In certain embodiments, the ink layer may include non-machine-readable indicia. The non-machine-readable indicia may or may not be unique to the stored value token. In certain embodiments, the non-machine-readable indicia may be printed on one or more of: the first surface portion of the second side; the second surface portion of the second side; the first side; and the non-planar element conjoining the first and second side.

Figure 7:
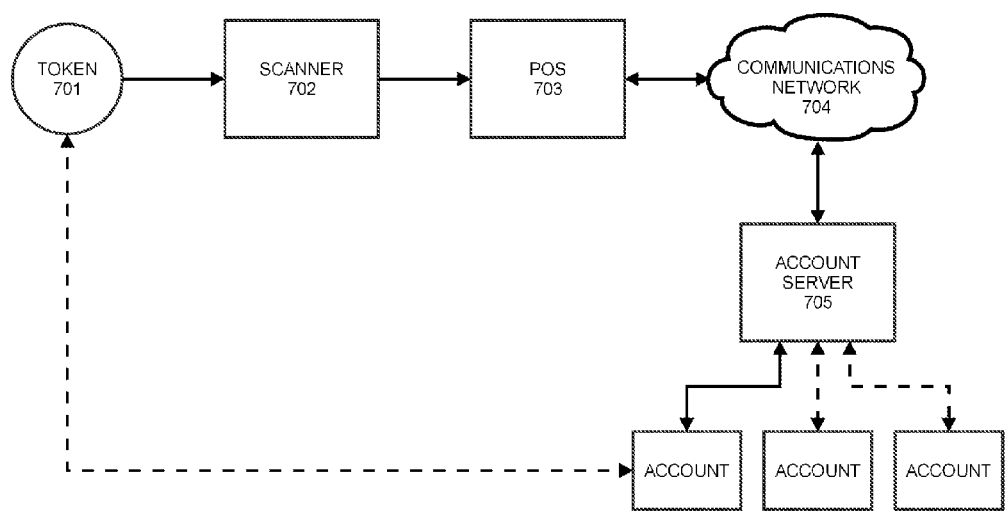
FIG. 7 is a block diagram representing an embodiment of a network system implementation in relation to a metallic stored value token in accordance with the present disclosure.

FIG. 7 is a block diagram representing an embodiment of a network system implementation in relation to a metallic stored value token as disclosed herein. Various embodiments contemplate the use of the stored value token in either or both of an open loop network system and a closed loop network system. The machine-readable indicia on the stored value token 701 is scanned by a scanning device 702 connected to a point-of-sale system 703. In an embodiment the point-of-sale system 703 determines from the scanned identifier the associated stored value account. In an alternative embodiment, the point-of-sale system 703 sends the identifier information via a communications network 704 to an account server 705, whereupon the account server 705 determines from the scanned identifier the associated stored value account. The account server 705 may be locally deployed relative to the point-of-sale system 703, such as within the back office of a retail store, or remotely deployed relative to the point-of-sale system 703, such as within a retailer-owned data center. The account server 705 may alternatively be remotely deployed for connection via a bank-authorized payment network including a payment processor and a bank where the value is stored.

The account server 705 may then determine the funds stored in the account associated with the identifier of the stored value token 701 and then return the fund amount to the point-of-sale system for authorization. In an embodiment, the account server 705 may deduct or add funds in accordance with instructions received from the point-of-sale system 703. In an embodiment, the account server may evaluate certain rules associated with the account number to determine if the purchase qualifies the account number to have funds added or deducted based upon rules associated with the coin as a medium of value related to a promotion.

In certain embodiments, a metallic stored value token as disclosed herein may further be provided with a radio frequency identification (RFID) tag or the like (not shown), wherein the metallic stored value token may be further interoperable with existing point-of-sale (POS) RFID readers and components. An embodiment of the metallic stored value token may be provided with a wireless bidirectional transceiver (e.g., beacon), wherein the token may be further interoperable with POS devices or even personal mobile communication devices.

A network system may implement various illustrative logical blocks, modules, and algorithm steps described in connection with the embodiments disclosed herein as electronic hardware, computer software, or combinations of both. Whether functionality as disclosed herein, or otherwise as may be apparent to one of skill in the art, is implemented as hardware or software depends upon the particular application and design constraints imposed on the overall system.

The various illustrative logical blocks, modules and algorithm steps can in certain embodiments be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The various illustrative logical blocks, modules and algorithm steps can in certain embodiments be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces. The term "parties" as used above is not limited to separate business entities or otherwise entities having a specified business relationship, but may typically refer to parties associated with the same business entity such as for example a server or other central computing device as may be communicatively linked to one or more client or distributed computing devices such as may be provided in a POS network, and may further refer to various client devices as communicatively linked to each other, various server or client devices as may be communicatively linked to each other and/or third party mobile computing devices having sufficient authorization for a given network, and the like.

The term "lacquer" as used herein may unless otherwise stated include lacquer, polyurethane, varnish, shellac, epoxy, or any other substantially clear, resinous material used in a thin application for surface coating.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for authorizing stored value account transactions at a traditional point of sale device, the system comprising:
    a metallic coin having a first side and a second side and further comprising:
        a first surface portion of the second side comprising a less reflective matte finish relative to the first side and a second surface portion of the second side,
        a substantially transparent coat layer upon the first surface portion of the second side,
        an ink layer comprising machine readable indicia upon the substantially transparent coat layer on the first surface portion,
        said machine readable indicia comprising a unique identifier with respect to the metallic coin; and
    a hosted server functionally linked to the traditional point of sale device via a communications network and configured upon receiving the identifier as scanned from the point of sale device to
        extract stored value information corresponding to an account associated with the identifier, and
        transmit said information to the point of sale device.

2. The system of claim 1, wherein the metallic coin further comprises an embedded RFID tag, interoperable with respect to point of sale RFID readers.

3. The system of claim 1, wherein the metallic coin further comprises a wireless bidirectional transceiver.

4. The system of claim 1, wherein the machine readable indicia comprises a barcode readable by traditional point of sale barcode scanners.

5. The system of claim 4, wherein the machine readable indicia is radially configured.

6. The system of claim 1, wherein the substantially transparent coat layer comprises a substantially transparent lacquer.

7. The system of claim 6, wherein the machine readable indicia comprises the ink layer bonded with the lacquer.

8. The system of claim 7, wherein the substantially transparent lacquer is further layered upon the first and second sides of the metallic substrate.

9. The system of claim 1, further comprising a graphical user interface linked to the hosted server and configured to
   enable user selection of an identifier from among one or more of the identifiers available to the user; and
   assign the identifier to a stored value account associated with the user.

10. A method for authorizing stored value account transactions at traditional point of sale devices, the method comprising:
    scanning machine readable indicia upon a metallic coin using a traditional point of sale device,
    wherein the machine readable indicia comprises a unique identifier with respect to the metallic coin, disposed in an ink layer upon a substantially transparent coat layer upon a first surface portion of one side of the metallic coin, and the first surface portion of said side comprises a less reflective matte finish relative to an opposing side and to a second surface portion of said side;
    determining an associated stored value account from the scanned identifier;
    extracting an amount of funds stored in association with the stored value account; and
    transmitting the amount of funds to the point of sale device.

11. The method of claim 10, further comprising evaluating rules associated with the account number to determine if a current transaction qualifies the account to have funds added or deducted based upon a promotion.

12. The method of claim 10, wherein the traditional point of sale device comprises a point of sale barcode scanner configured to scan a barcode as the machine readable indicia.

13. The method of claim 10, further comprising:
    enabling, via a graphical user interface, user selection of an identifier from among one or more of the identifiers available to the user; and
    assigning the identifier to a stored value account associated with the user.

14. The method of claim 10, further comprising:
    enabling, via a graphical user interface, selection of a user account from among a plurality of user accounts; and
    assigning the identifier to the selected account.

15. A system for authorizing stored value account transactions at a traditional point of sale device, the system comprising:
    a graphical user interface configured to receive user selection input corresponding to an identifier unique to a stored value account and a logo unique to a class of stored value accounts;
    a metallic coin having a first side and a second side and further comprising:
        a first surface portion of the second side comprising a less reflective matte finish relative to the first side and a second surface portion of the second side,
        a substantially transparent coat layer upon the first surface portion of the second side,
        an ink layer comprising machine readable indicia upon the substantially transparent coat layer on the first surface portion, said machine readable indicia comprising the selected unique identifier, and non-machine readable indicia comprising the selected logo; and
    a hosted server functionally linked to the traditional point of sale device via a communications network and configured upon receiving the identifier as scanned from the point of sale device to
        extract stored value information corresponding to the stored value account, and
        transmit said information to the point of sale device.

16. The system of claim 15, wherein the metallic coin further comprises an embedded RFID tag, interoperable with respect to point of sale RFID readers.

17. The system of claim 15, wherein the metallic coin further comprises a wireless bidirectional transceiver.

18. The system of claim 15, wherein the machine readable indicia comprises a barcode readable by traditional point of sale barcode scanners.

19. The system of claim 18, wherein the machine readable indicia is radially configured.

20. The system of claim 15, wherein the substantially transparent coat layer of the stored value token comprises a substantially transparent lacquer further layered upon the first and second sides of the metallic substrate, and
    wherein the machine readable indicia comprises the ink layer bonded with the lacquer.

\* \* \* \* \*